(12) United States Patent
Kalia et al.

(10) Patent No.: US 8,615,458 B2
(45) Date of Patent: *Dec. 24, 2013

(54) INDUSTRY SIZE OF WALLET

(71) Applicant: American Express Travel Related Services Company, Inc., New York, NY (US)

(72) Inventors: Prashant Kalia, Fair Lawn, NJ (US); Karlyn Heiner Crotty, Pennington, NJ (US); Iwao Fusillo, Merrick, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,178

(22) Filed: Feb. 25, 2013

(65) Prior Publication Data

US 2013/0191262 A1 Jul. 25, 2013

Related U.S. Application Data

(63) Continuation of application No. 13/538,936, filed on Jun. 29, 2012, now Pat. No. 8,401,947, which is a continuation of application No. 11/608,179, filed on Dec. 7, 2006, now Pat. No. 8,239,250.

(60) Provisional application No. 60/868,229, filed on Dec. 1, 2006.

(51) Int. Cl.
*G06Q 40/00* (2012.01)

(52) U.S. Cl.
USPC .............................. 705/35; 705/36 R; 705/37

(58) Field of Classification Search
USPC ............................................ 705/35, 36 R, 37
See application file for complete search history.

(56) References Cited

U.S. PATENT DOCUMENTS

| 5,621,201 A | 4/1997 | Langhans et al. |
| 5,699,527 A | 12/1997 | Davidson |

(Continued)

FOREIGN PATENT DOCUMENTS

| JP | 2001282957 | 10/2001 |
| JP | 2002163449 | 6/2002 |

(Continued)

OTHER PUBLICATIONS

Card Marketing; "Card companies tap credit bureaus for data streams (Experian (Orange, CAI hopes to develop data mining tools to track the 'emerging consumer', such as start-up business and immigrant populations)"; Feb. 1998; pp. 1 and 2.

(Continued)

*Primary Examiner* — Nga B. Nguyen
(74) *Attorney, Agent, or Firm* — Snell & Wilmer L.L.P.

(57) ABSTRACT

Consumer spend by industry is modeled based on the industry sizes of wallet of consumers having a high share of wallet with a financial institution. A size of wallet is calculated for each consumer in a plurality of consumers. A share of wallet for each consumer is also calculated. A subset of the plurality of consumers whose share of wallet is above a given percentage of their size of wallet is then determined. For each consumer in the subset, an industry size of wallet is determined. A correlation between the industry size of wallet of a given consumer and one or more characteristics of the given consumer is then derived using the industry size of wallet for the consumers in the subset.

20 Claims, 12 Drawing Sheets

(56) References Cited

U.S. PATENT DOCUMENTS

| | | |
|---|---|---|
| 5,712,985 A | 1/1998 | Lee et al. |
| 5,819,226 A | 10/1998 | Gopinathan et al. |
| 5,864,830 A | 1/1999 | Armetta et al. |
| 5,930,774 A | 7/1999 | Chennault |
| 5,966,699 A | 10/1999 | Zandi |
| 5,974,396 A | 10/1999 | Anderson et al. |
| 6,021,362 A | 2/2000 | Maggard |
| 6,026,398 A | 2/2000 | Brown |
| 6,058,375 A | 5/2000 | Park |
| 6,105,001 A | 8/2000 | Masi et al. |
| 6,119,103 A | 9/2000 | Basch et al. |
| 6,128,599 A | 10/2000 | Walker et al. |
| 6,134,548 A | 10/2000 | Gottsman et al. |
| 6,185,543 B1 | 2/2001 | Galperin et al. |
| 6,249,770 B1 | 6/2001 | Erwin et al. |
| 6,266,649 B1 | 7/2001 | Linden et al. |
| 6,298,348 B1 | 10/2001 | Eldering |
| 6,307,958 B1 | 10/2001 | Deaton et al. |
| 6,311,169 B2 | 10/2001 | Duhon |
| 6,324,524 B1 | 11/2001 | Lent et al. |
| 6,330,546 B1 | 12/2001 | Gopinathan et al. |
| 6,374,230 B1 | 4/2002 | Walker et al. |
| 6,405,181 B2 | 6/2002 | Lent et al. |
| 6,430,539 B1 | 8/2002 | Lazarus et al. |
| 6,654,727 B2 | 11/2003 | Tilton |
| 6,658,412 B1 | 12/2003 | Jenkins et al. |
| 6,687,713 B2 | 2/2004 | Mattson et al. |
| 6,836,764 B1 | 12/2004 | Hucal |
| 6,839,682 B1 | 1/2005 | Blume et al. |
| 6,859,785 B2 | 2/2005 | Case |
| 7,076,462 B1 | 7/2006 | Nelson et al. |
| 7,165,036 B2 | 1/2007 | Kruk et al. |
| 7,191,150 B1 | 3/2007 | Shao et al. |
| 7,249,076 B1 | 7/2007 | Pendleton et al. |
| 7,249,114 B2 | 7/2007 | Burchetta et al. |
| 7,324,962 B1 | 1/2008 | Valliani et al. |
| 7,346,573 B1 | 3/2008 | Cobrinik et al. |
| 7,373,324 B1 | 5/2008 | Engin et al. |
| 7,376,603 B1 | 5/2008 | Mayr et al. |
| 7,376,618 B1 | 5/2008 | Anderson et al. |
| 7,403,942 B1 | 7/2008 | Bayliss |
| 7,409,362 B2 | 8/2008 | Calabria |
| 7,426,488 B1 | 9/2008 | Gompers et al. |
| 7,472,090 B1 | 12/2008 | White |
| 7,516,149 B2 | 4/2009 | Motwani et al. |
| 7,552,074 B2 | 6/2009 | Bruce et al. |
| 7,555,451 B2 | 6/2009 | Rugge et al. |
| 7,624,070 B2 | 11/2009 | Lebouitz |
| 7,647,344 B2 | 1/2010 | Skurtovich et al. |
| 7,657,471 B1 | 2/2010 | Sankaran et al. |
| 7,657,540 B1 | 2/2010 | Bayliss |
| 7,665,657 B2 | 2/2010 | Huh |
| 7,716,125 B2 | 5/2010 | Shavit et al. |
| 7,753,259 B1 | 7/2010 | Taylor et al. |
| 7,788,147 B2 | 8/2010 | Haggerty et al. |
| 7,792,715 B1 | 9/2010 | Kasower |
| 7,890,420 B2 | 2/2011 | Haggerty et al. |
| 7,912,842 B1 | 3/2011 | Bayliss |
| 7,912,865 B2 | 3/2011 | Akerman et al. |
| 7,945,512 B2 | 5/2011 | Scipioni et al. |
| 7,966,235 B1 | 6/2011 | Capelli et al. |
| RE42,663 E | 8/2011 | Lazarus et al. |
| 8,001,153 B2 | 8/2011 | Skurtovich et al. |
| 8,065,264 B1 | 11/2011 | Achanta |
| 8,239,250 B2 * | 8/2012 | Kalia et al. .................. 705/7.29 |
| 8,266,168 B2 | 9/2012 | Bayliss |
| 8,275,770 B2 | 9/2012 | Bayliss |
| 8,326,712 B2 | 12/2012 | Deliwala et al. |
| 2001/0011245 A1 | 8/2001 | Duhon |
| 2001/0013011 A1 | 8/2001 | Day et al. |
| 2001/0027413 A1 | 10/2001 | Bhutta |
| 2001/0054022 A1 | 12/2001 | Louie et al. |
| 2002/0019804 A1 | 2/2002 | Sutton |
| 2002/0029188 A1 | 3/2002 | Schmid |
| 2002/0046096 A1 | 4/2002 | Srinivasan et al. |
| 2002/0049626 A1 | 4/2002 | Mathias et al. |
| 2002/0052836 A1 | 5/2002 | Galperin et al. |
| 2002/0052884 A1 | 5/2002 | Farber et al. |
| 2002/0073099 A1 | 6/2002 | Gilbert et al. |
| 2002/0077964 A1 | 6/2002 | Brody et al. |
| 2002/0095360 A1 | 7/2002 | Joao |
| 2002/0099649 A1 | 7/2002 | Lee et al. |
| 2002/0107765 A1 | 8/2002 | Walker |
| 2002/0123960 A1 | 9/2002 | Ericksen |
| 2002/0133444 A1 | 9/2002 | Sankaran et al. |
| 2002/0143661 A1 | 10/2002 | Tumulty et al. |
| 2002/0147623 A1 | 10/2002 | Rifaat |
| 2002/0178096 A1 | 11/2002 | Marshall |
| 2002/0194099 A1 | 12/2002 | Weiss |
| 2002/0194117 A1 | 12/2002 | Nabe et al. |
| 2002/0194140 A1 | 12/2002 | Makuck |
| 2002/0198688 A1 | 12/2002 | Feldman |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0018549 A1 | 1/2003 | Fei et al. |
| 2003/0046223 A1 | 3/2003 | Crawford et al. |
| 2003/0061132 A1 | 3/2003 | Yu et al. |
| 2003/0093289 A1 | 5/2003 | Thornley et al. |
| 2003/0101131 A1 | 5/2003 | Warren et al. |
| 2003/0105696 A1 | 6/2003 | Kalotay et al. |
| 2003/0113727 A1 | 6/2003 | Gim et al. |
| 2003/0115080 A1 | 6/2003 | Kasravi et al. |
| 2003/0130878 A1 | 7/2003 | Kruk et al. |
| 2003/0130884 A1 | 7/2003 | Michaluk |
| 2003/0139986 A1 | 7/2003 | Roberts |
| 2003/0149610 A1 | 8/2003 | Rowan et al. |
| 2003/0149659 A1 | 8/2003 | Danaher et al. |
| 2003/0171942 A1 | 9/2003 | Gaito |
| 2003/0208428 A1 | 11/2003 | Raynes et al. |
| 2003/0212618 A1 | 11/2003 | Keyes et al. |
| 2003/0229580 A1 | 12/2003 | Gass et al. |
| 2003/0236725 A1 | 12/2003 | Hickox et al. |
| 2004/0002916 A1 | 1/2004 | Timmerman et al. |
| 2004/0024692 A1 | 2/2004 | Turbeville et al. |
| 2004/0034570 A1 | 2/2004 | Davis |
| 2004/0064401 A1 | 4/2004 | Palaghita et al. |
| 2004/0078248 A1 | 4/2004 | Altschuler |
| 2004/0088221 A1 | 5/2004 | Katz et al. |
| 2004/0088257 A1 | 5/2004 | Wong et al. |
| 2004/0093278 A1 | 5/2004 | Burchetta et al. |
| 2004/0107123 A1 | 6/2004 | Haffner et al. |
| 2004/0107161 A1 | 6/2004 | Tanaka et al. |
| 2004/0111363 A1 | 6/2004 | Trench et al. |
| 2004/0162763 A1 | 8/2004 | Hoskin et al. |
| 2004/0177030 A1 | 9/2004 | Shoham |
| 2004/0177036 A1 | 9/2004 | Natahara et al. |
| 2004/0199456 A1 | 10/2004 | Flint et al. |
| 2004/0225586 A1 | 11/2004 | Woods et al. |
| 2004/0230459 A1 | 11/2004 | Dordick et al. |
| 2005/0015330 A1 | 1/2005 | Beery et al. |
| 2005/0033734 A1 | 2/2005 | Chess et al. |
| 2005/0055275 A1 | 3/2005 | Newman et al. |
| 2005/0080698 A1 | 4/2005 | Perg et al. |
| 2005/0125334 A1 | 6/2005 | Masella et al. |
| 2005/0159996 A1 | 7/2005 | Lazaraus et al. |
| 2005/0171884 A1 | 8/2005 | Arnott |
| 2005/0197954 A1 | 9/2005 | Maitland et al. |
| 2005/0262014 A1 | 11/2005 | Fickes |
| 2006/0004654 A1 | 1/2006 | Kornegay et al. |
| 2006/0010055 A1 | 1/2006 | Morita et al. |
| 2006/0095923 A1 | 5/2006 | Novack et al. |
| 2006/0155624 A1 | 7/2006 | Schwartz |
| 2006/0178957 A1 | 8/2006 | LeClaire |
| 2006/0195390 A1 | 8/2006 | Rusk et al. |
| 2006/0229943 A1 | 10/2006 | Mathias et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242049 A1 | 10/2006 | Haggerty et al. |
| 2006/0242050 A1 | 10/2006 | Haggerty et al. |

(56) References Cited

U.S. PATENT DOCUMENTS

| | | |
|---|---|---|
| 2006/0242051 A1 | 10/2006 | Haggerty et al. |
| 2006/0253328 A1 | 11/2006 | Kohli et al. |
| 2006/0259364 A1 | 11/2006 | Strock et al. |
| 2006/0265259 A1 | 11/2006 | Diana et al. |
| 2006/0271552 A1 | 11/2006 | McChesney et al. |
| 2006/0282356 A1 | 12/2006 | Andres et al. |
| 2007/0011026 A1 | 1/2007 | Higgins et al. |
| 2007/0016501 A1 | 1/2007 | Chatterji et al. |
| 2007/0055598 A1 | 3/2007 | Arnott et al. |
| 2007/0055599 A1 | 3/2007 | Arnott |
| 2007/0067206 A1 | 3/2007 | Haggerty et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0078741 A1 | 4/2007 | Haggerty et al. |
| 2007/0083418 A1 | 4/2007 | Quiring et al. |
| 2007/0100719 A1 | 5/2007 | Chwast et al. |
| 2007/0168246 A1 | 7/2007 | Haggerty et al. |
| 2007/0168267 A1 | 7/2007 | Zimmerman et al. |
| 2007/0192165 A1 | 8/2007 | Haggerty et al. |
| 2007/0226114 A1 | 9/2007 | Haggerty et al. |
| 2007/0226130 A1 | 9/2007 | Haggerty et al. |
| 2007/0244779 A1 | 10/2007 | Wolff |
| 2007/0265957 A1 | 11/2007 | Advani et al. |
| 2008/0033852 A1 | 2/2008 | Megdal et al. |
| 2008/0195425 A1 | 8/2008 | Haggerty et al. |
| 2008/0195444 A1 | 8/2008 | Haggerty et al. |
| 2008/0195445 A1 | 8/2008 | Haggerty et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222015 A1 | 9/2008 | Megdal et al. |
| 2008/0222016 A1 | 9/2008 | Megdal et al. |
| 2008/0222027 A1 | 9/2008 | Megdal et al. |
| 2008/0222054 A1 | 9/2008 | Blagg et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0255897 A1 | 10/2008 | Megdal et al. |
| 2008/0275820 A1 | 11/2008 | Joao et al. |
| 2009/0006245 A1 | 1/2009 | Rabson |
| 2009/0106141 A1 | 4/2009 | Becker |
| 2009/0132347 A1 | 5/2009 | Anderson |
| 2009/0144160 A1 | 6/2009 | Haggerty et al. |
| 2009/0144185 A1 | 6/2009 | Haggerty et al. |
| 2010/0088220 A1 | 4/2010 | Langley |
| 2010/0094910 A1 | 4/2010 | Bayliss |
| 2010/0250469 A1 | 9/2010 | Megdal et al. |
| 2010/0287093 A1 | 11/2010 | He et al. |
| 2011/0078011 A1 | 3/2011 | Senghore et al. |
| 2011/0078073 A1 | 3/2011 | Annappindi |
| 2011/0276471 A1 | 11/2011 | Haggerty et al. |
| 2012/0046979 A1 | 2/2012 | Chatterji et al. |
| 2012/0084230 A1 | 4/2012 | Megdal et al. |
| 2012/0109734 A1 | 5/2012 | Fordyce et al. |
| 2012/0116951 A1 | 5/2012 | Chung et al. |
| 2012/0123968 A1 | 5/2012 | Megdal et al. |
| 2012/0136763 A1 | 5/2012 | Megdal et al. |
| 2012/0185296 A1 | 7/2012 | Haggerty et al. |
| 2012/0185297 A1 | 7/2012 | Chatterji et al. |
| 2012/0221452 A1 | 8/2012 | Haggerty et al. |

FOREIGN PATENT DOCUMENTS

| | | |
|---|---|---|
| JP | 2003316950 | 11/2003 |
| WO | 0116896 | 3/2001 |
| WO | 0139090 | 5/2001 |
| WO | 0180053 | 10/2001 |

OTHER PUBLICATIONS

American Banker; "Eyes on Credit Software to Predict Bankruptcies in Demand (Companies that help identify consumers at risk of declaring bankruptcy are doing a booming business; some 1,350,118 peoplse filed for bankruptcy in 1998, up 95% over 1990 levels)"; Mar. 4, 1999; pp. 1 and 2.

Wright, D.; "Comparative evaluation of electronic payment systems"; Feb. 2002; p. 1.

Taiwan: Plastic Money Frims Break New Ground; "Plastic money turns to enterprise market"; Apr. 7, 1995; p. 1.

Messmer, Ellen; Network World; "Firm taps B2B e-comm to boost customer service. Company Business and Marketing"; Feb. 7, 2000; pp. 1 and 2.

American Banker; "Amex Offers Small-Firm Card With Built-in Spending Limits"; Jul. 31, 1995; p. 1.

Kim Namwoon; "Using Market Diffusion Models for Developing and Assessing Marketing Strategies (Technical Products)"; 1993; p. 1.

Bertrand Marotte; "powerful eye mines the depths of consumer spending: Bertrand Marotte explains how companies use information on your purchases to their advantage—and even your disadvantage.; [Final Edition]"; Jan. 14, 1998; pp. 1 and 2.

Examiner's Report in Canadian Application No. 2,592,944.

USPTO; All Office Actions (Non-Final, Final, Advisory Actions, Restrictions/Elections, etc.), Notices of Allowance, 892s, 1449s and SB/08As from U.S. Appl. Nos. 13/403,634; 13/403,651; 13/403,680; 13/403,700; 13/403,728; 13/403,736; 13/403,746; 13/403,768; 13/403,778; 13/432,890; 13/432,968; 13/432,941; 13/465,837; 13/538,936; 13/480,910; 13/622,957; 13/570,120; 13/644,541; 13/769,670.

Office Action received Jun. 12, 2012 in Mexican Application No. MX/a/2008/001717.

Examiner's Report dated Apr. 21, 2012 in Canadian Application No. 2,617,798.

Office Action in Mexican Application No. MX/a/2007/012294.

USPTO; All Office Actions (Non-Final, Final, Advisory Actions, Restrictions/Elections, etc.), Notices of Allowance, 892s, 1449s and SB/08As from U.S. Appl. Nos. 11/497,563; 11/497,521; 12/833,708; 11/497,529; 11/497,530; 11/497,562; 12/833,741; 12/909,645; 13/170,006; 11/497,527; 11/586,728; 11/586,737; 12/103,418; 12/103 403; 12/103,394; 13/165,627; 11/169,588; 13/032,427; 12/984,801; 12/904,732; 11/169,778; 11/169,664; 11/615,747.

USPTO; All Office Actions (Non-Final, Final, Advisory Actions, Restrictions/Elections, etc.), Notices of Allowance, 892s, 1449s and SB/08As from U.S. Appl. Nos. 11/611,699; 11/608,179; 13/209,035; 13/274,029; 12/180,256; 12/144,506; 13/274,046; 10/978,298; 12/777,030; 11/169,769; 12/368,817; 12/368,799; 11/169,779; 13/286 884; 13/302,921; 13/356,270; 13/403,752; 11/394,206; 11/394,217; 11/394,165; 11/394,166; 11/394,199; 11/169,589.

MX; Office Action dated Aug. 17, 2011 in Application No. MX/a/2008/001717.

Examiner's Report No. 4, for Australian Application No. 2006285253, dated Jan. 27, 2011.

JP; Office Action dated Nov. 26, 2010 in Application No. 2008-525214.

Examiner's Report No. 3, for Australian Application No. 2006285253, dated Oct. 28, 2010.

Examiner's Report No. 2, for Australian Application No. 2006285253, dated Aug. 11, 2010.

Examiner's Report No. 1, for Australian Application No. 2006285253, dated Jul. 27, 2009.

International Preliminary Report on Patentability for PCT Appln. No. PCT/US07/25964 dated Jun. 24, 2009.

Examiner's Report No. 5, for Australian Application No. 2006285253, dated Apr. 8, 2011.

(56) References Cited

OTHER PUBLICATIONS

MX; Office Action dated Jun. 17, 2011 in Application No. MX/a/2007/012294.
Cantor, R. and Packer, F., "The Credit Rating Industry," FRBNY Quarterly Review, Summer-Fall, 1994, pp. 1-24.
AISG's National Underwriting Database, A-Plus, is Now the Largest in the Industry, Business Wire, Aug. 7, 1997, pp. 1-2.
Alexander David, "Controlling Information Premia by Repackaging Asset-Backed Securities," The Journal of Risk and Insurance, Dec. 1997, 26 pages.
Industry Briefs Credit Risk Management Report, Potomac, Mar. 9, 1998, vol. 8, Iss. 4, pp. 1-2.
Dataman Group web page from Aug. 22, 2001; http://web.archive.org/web/20010822113446/http://www.datamangroup.com/summarized_credit.asp (1 of 2) on Sep. 14, 2010 10:48:45 AM, pp. 1-2.
comScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Internal Revenue Service Data Book 2000, Issued Aug. 2001, Revised May 2003, pp. 1-56.
GAO-03-661 Best Practices Improved Knowledge of DOD Service Contracts Could Reveal Significant Savings, GAO, Jun. 2003, pp. 1-45.
DOE/EIA-M065(2004, Model Documentation Report: Macroeconomic Activity Module (MAM) of the National Energy Modeling System, EIA, U.S. Department of Energy, Washington DC, Feb. 2004, pp. 1-B33.
Saunders, A., "Data Goldmine," Management Today, London: Mar. 2004, 6 pages.
Fair ISAAC Announces Integrated, End-to-End Collection and Recovery Solution, Business Wire, New York, Sep. 2, 2004, p. 1.
Chen, Yuxin et al., "Modeling Credit Card 'Share of Wallet': Solving the Incomplete Information Problem," New York University: Kaufman Management Center, http://www.gsb.stanford.edu/facseminars/events/marketing/pdfs/F2004_10-27_Chen.pdf, Oct. 27, 2004, 48 pages.
Verstraeten, Geert, Ph.D.; Issues in predictive modeling of individual customer behavior: Applications in targeted marketing and consumer credit scoring; Unversiteit Gent (Belgium) 2005, pp. 1 and 2.
William R. Dillon, John B. White, Vithala R. Rao, and Doug Filak; "Good Science"; Marketing Research; vol. 9, Iss. 4; Winter 1997; pp. 1-11.
Srikanta Chatterjee, Claudio Michelini, and Ranjan Ray; "Expenditure Patterns and Aggregate Consumer Behavior; Some Experiments with Austrialian and New Zealand Data"; The Economic Record, vol. 70, No. 210; Sep. 1994; pp. 278-291.
Jost, Allen; Credit World, v81, n4; Neural networks; Mar./Apr. 1993; pp. 1-9.
American Banker; "AT&T Expected to Turn Up Heat in Card Wars"; vol. 158, No. 101; May 27, 1993; pp. 1-3.
Credit Card Management; "Neural Nets Shoot for Jackpot"; Dec. 1995; pp. 1-6.
Bank Technology News; "The Road to Better Credit-Card Marketing"; Sep. 1995; pp. 1-4.
http://kewaneecreditbureau.com/Credit.Trends.pdf, Aug. 2000, pp. 1-4.
Wyatt, Craig, "Usage models just for merchants," Credit Card Management vol. 8, Iss. 6, Sep. 1995, pp. 1-4.
Fickenscher, Lisa, "Merchant American Express Seeks to Mine its Data on Cardholder Spending Patterns," American Banker, vol. 162, Issue 56, Mar. 24, 1997, pp. 1-2.

International Search Report for Int'l Appln. No. PCT/US06/30384 dated Dec. 26, 2006.
Written Opinion for PCT Appln. No. PCT/US06/30384 dated Dec. 26, 2006.
International Search Report for Int'l Appln. No. PCT/US06/25569 dated Mar. 28, 2007.
Written Opinion for PCT Appln. No. PCT/US06/25569 dated Mar. 28, 2007.
International Preliminary Report on Patentability for PCT Appln. No. PCT/US06/30384 dated Oct. 22, 2007.
International Preliminary Report on Patentability for PCT Appln. No. PCT/US06/25569 dated Jan. 9, 2008.
International Search Report for Int'l Appln. No. PCT/US07/25964 dated Apr. 8, 2008.
Written Opinion for PCT Appln. No. PCT/US07/25964 dated Apr. 8, 2008.
International Search Report for PCT Application No. PCT/US07/25574 dated May 9, 2008.
Written Opinion for PCT Application No. PCT/US07/25574 dated May 9, 2008.
International Preliminary Report on Patentability for PCT Application No. PCT/US07/25574 dated Jun. 16, 2009.
"Balance Transfers Offer Opportunities, Risk Credit Management Report" Jan. 29, 1996, vol. 6, Issue 2, Phillips Business Information—Newsletter, pp. 1-3.
"Credit Trends," Experian Information Solutions, Inc., Aug. 2000, pp. 1-4.
Office Action dated Mar. 1, 2013 in U.S. Appl. No. 11/586,737.
Office Action dated Mar. 7, 2013 in U.S. Appl. No. 13/403,736.
Notice of Allowance dated Mar. 11, 2013 in U.S. Appl. No. 13/622,957.
Examiner's Report dated Feb. 8, 2013 in Canadian Application No. 2,617,798.
Notice of Allowance dated Mar. 14, 2013 in U.S. Appl. No. 13/403,746.
Advisory Action dated Mar. 14, 2013 in U.S. Appl. No. 11/169,664.
Advisory Action dated Mar. 15, 2013 in U.S. Appl. No. 12/144,506.
Office Action dated Mar. 20, 2013 in U.S. Appl. No. 12/403,700.
Notice of Allowance dated Mar. 21, 2013 in U.S. Appl. No. 13/209,035.
Office Action dated Mar. 29, 2013 in U.S. Appl. No. 12/103,418.
Office Action dated Mar. 29, 2013 in U.S. Appl. No. 12/403,728.
Restriction Requirement dated Apr. 4, 2013 in U.S. Appl. No. 13/403,768.
Final Office Action dated Apr. 5, 2013 in U.S. Appl. No. 13/403,651.
Restriction Requirement dated Apr. 12, 2013 in U.S. Appl. No. 13/403,752.
Office Action dated Apr. 30, 2013 in U.S. Appl. No. 12/403,680.
Notice of Allowance dated May 2, 2013 in U.S. Appl. No. 13/403,634.
Office Action dated May 14, 2013 in U.S. Appl. No. 13/403,752.
Office Action dated May 15, 2013 in U.S. Appl. No. 13/403,768.
Advisory Action dated Jun. 6, 2013 in U.S. Appl. No. 13/403,651.
Notice of Allowance dated Jun. 7, 2013 in U.S. Appl. No. 11/615,747.
Final Office Action dated Jun. 14, 2013 in U.S. Appl. No. 13/032,427.
Office Action dated Jun. 20, 2013 in U.S. Appl. No. 12/180,256.
Office Action dated Jul. 12, 2013 in U.S. Appl. No. 13/403,778.
Office Action dated Jun. 10, 2013 in Mexican Application No. MX/a/2008/001717.
Office Action dated Jul. 9, 2013 in Canadian Application No. 2,592,944.
Notice of Allowance dated Jul. 24, 2013 in U.S. Appl. No. 13/403,736.
Notice of Allowance dated Aug. 13, 2013 in U.S. Appl. No. 11/586,737.
Office Action dated Aug. 16, 2031 in U.S. Appl. No. 13/644,541.
Notice of Allowance dated Aug. 20, 2013 in U.S. Appl. No. 11/586,737.
Advisory Action dated Aug. 23, 2013 in U.S. Appl. No. 13/032,427.
Office Action dated Aug. 23, 2013 in U.S. Appl. No. 11/169,778.

* cited by examiner

INDUSTRY SIZE OF WALLET

CROSS-REFERENCE TO RELATED APPLICATIONS

This application is a continuation of U.S. patent application Ser. No. 13/538,936, filed Jun. 29, 2012 and entitled "INDUSTRY SIZE OF WALLET" which is incorporated by reference herein in its entirety. The '936 application is a continuation of U.S. patent application Ser. No. 11/608,179, now U.S. Pat. No. 8,239,250, filed Dec. 7, 2006 and entitled "INDUSTRY SIZE OF WALLET" which is incorporated by reference herein in its entirety. The '179 Application claims the benefit of U.S. Provisional Patent Application No. 60/868,229, filed Dec. 1, 2006 and entitled "INDUSTRY SIZE OF WALLET" which is incorporated by reference herein in its entirety.

BACKGROUND OF THE INVENTION

1. Field of the Invention

The present application relates to financial data processing, in particular customer modeling and behavioral analysis.

2. Background Art

It is axiomatic that consumers will tend to spend more when they have greater purchasing power. The capability to accurately estimate a consumer's spend capacity could therefore allow a financial institution (such as a credit company, lender or any consumer services company) to better target potential prospects and identify any opportunities to increase consumer transaction volumes, without an undue increase in the risk of defaults. Consumers will be most attracted to products that are customized specifically for their individual interests and spending patterns. Attracting additional consumer spending in this manner, in turn, would increase such financial institution's revenues, primarily in the form of an increase in transaction fees and interest payments received. Consequently, a consumer model that can accurately estimate purchasing power and identify industries in which the consumer is most interested in spending is of paramount interest to many financial institutions and other consumer services companies.

A limited ability to estimate consumer spend behavior from point-in-time credit data has previously been available. A financial institution can, for example, simply monitor the balances of its own customers' accounts. When a credit balance is lowered, the financial institution could then assume that the corresponding consumer now has greater purchasing power. Sikh an assumption has its flaws, however. For example, it is oftentimes difficult to confirm whether the lowered balance is the result of a balance transfer to another account. Such balance transfers represent no increase in the consumer's capacity to spend, and so this simple model of consumer behavior has its flaws.

In order to achieve a complete picture of any consumer's purchasing ability and interests, one must examine in detail the full range of a consumer's financial accounts, including credit accounts, checking and savings accounts, investment portfolios, and the like. However, the vast majority of consumers do not maintain all such accounts with the same financial institution and the access to detailed financial information from other financial institutions is restricted by consumer privacy laws, disclosure policies and security concerns.

There is limited and incomplete consumer information from credit bureaus and the like at the aggregate and individual consumer levels. Since balance transfers are nearly impossible to consistently identify from the ace of such records, this information has not previously been enough to obtain accurate estimates of a consumer's actual spending ability.

Accordingly, there is a need for a method and apparatus for determining a customer's size of wallet along with specific industries in which the customer is most likely to spend which addresses certain problems of existing technologies.

SUMMARY OF THE INVENTION

In one embodiment of the present invention, consumer spend by industry is modeled based on the industry sizes of wallet of consumers having a high share of wallet with a financial institution. A size of wallet is calculated for each consumer in a plurality of consumers. A share of wallet for each consumer is also calculated. A subset of the plurality of consumers whose share of wallet is above a given percentage of their size of wallet is then determined. For each consumer in the subset, an industry size of wallet is determined. A correlation between the industry size of wallet of a given consumer and one or more characteristics of the given consumer is then derived using the industry size of wallet for the consumers in the subset.

In another embodiment of the present invention, a customer can be targeted with an offer to increase the customer's industry share of wallet associated with a given financial institution. To do this, an industry size of wallet is estimated for one or more consumers. The external size of the industry size of wallet of each consumer is calculated, and one or more consumers having a relatively high external size of the industry wallet (that is, potential) and a reasonably high total share of wallet with the financial institution (that is, engagement with the financial institution) are targeted with offers to increase their industry share of wallet associated with the financial institution.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
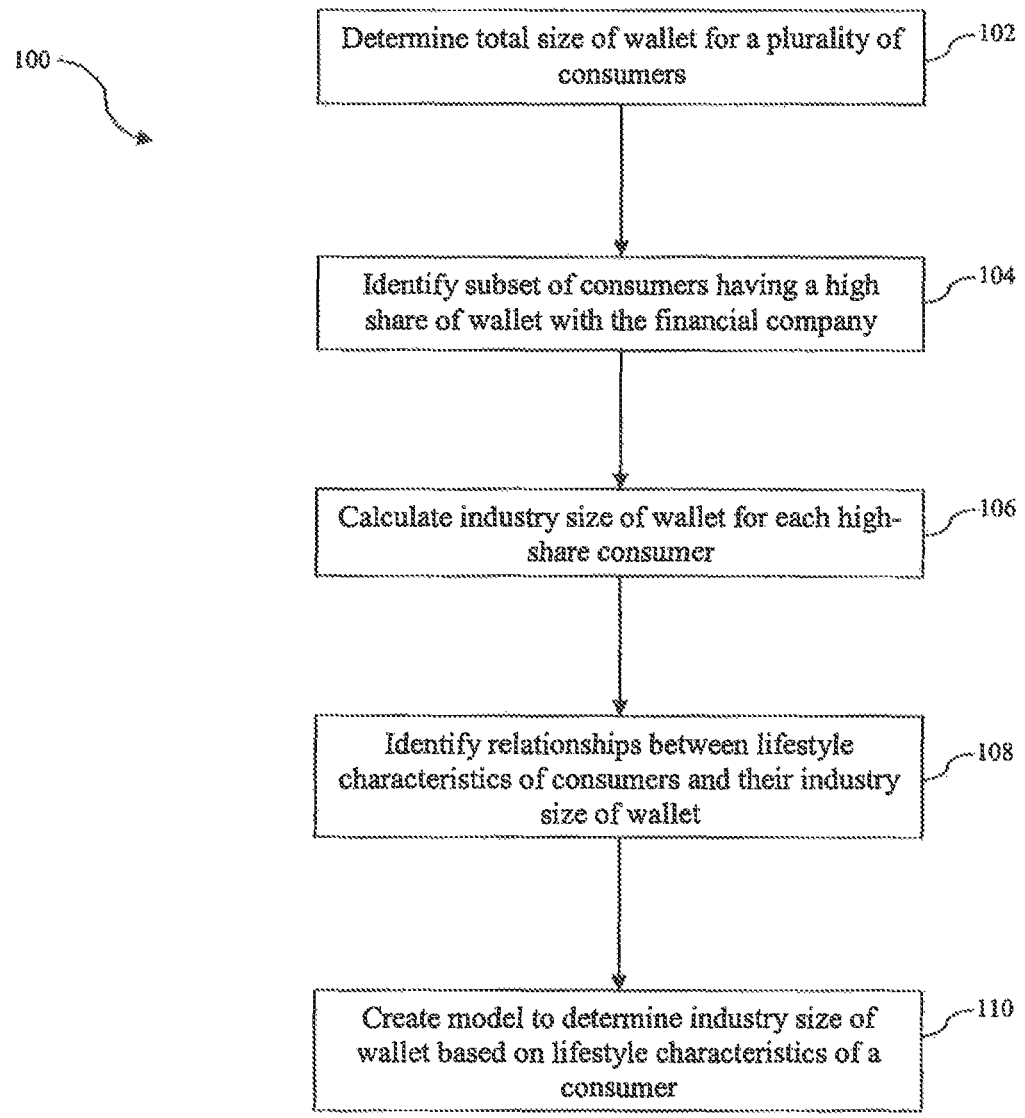
FIG. 1 is a flowchart of an exemplary process for creating an industry size of wallet model.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for determining a household size of wallet.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

A transaction account has a basic user, who is the primary user associated with the account. A transaction account may also have a supplemental user who is given access to the account by the basic user. The supplemental user may possess a duplicate of the transaction instrument associated with the account.

3. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

As used herein, the following terms shall have the following meanings. A trade or tradeline refers to a credit or charge vehicle issued to an individual customer by a credit grantor. Types of tradelines include, for example and without limitation, bank loans, credit card accounts, retail cards, personal lines of credit and car loans/leases. For purposes here, use of the term credit card shall be construed to include charge cards except as specifically noted. Tradeline data describes the customer's account status and activity, including, for example, names of companies where the customer has accounts, dates such accounts were opened, credit limits, types of accounts, balances over a period of time and summary payment histories. Tradeline data is generally available for the vast majority of actual consumers. Tradeline data, however, does not include individual transaction data, which is largely unavailable because of consumer privacy protections. Tradeline data may be used to determine both individual and aggregated consumer spending patterns, as described herein.

Consumer panel data measures consumer spending patterns from information that is provided by, typically, millions of participating consumer panelists. Such consumer panel data is available through various consumer research companies, such as comScore Networks, Inc. of Reston, Va. Consumer panel data may typically include individual consumer information such as credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, is limited to those consumers who have participated in the consumer panel, and so such detailed data may not be available for all consumers.

Although the present invention is described as relating to individual consumers, one of skill in the pertinent art(s) will recognize that it can also apply to small businesses and organizations without departing from the spirit and scope of the present invention.

II. Industry Size of Wallet

Consumers tend to spend more when they have greater purchasing power. It is thus advantageous for a financial institution (such as a credit company, lender or any consumer services company) to target existing customers and potential customers with opportunities to increase their transaction volumes. The capability to accurately estimate a consumer's spend capacity allows the financial institution to target potential prospects and identify any opportunities to increase consumer transaction volumes, without the financial institution experiencing an undue increase in the risk of defaults.

Additionally, consumers are most attracted to products that are customized specifically for their individual interests and spending patterns. Attracting additional consumer spending in this manner, in turn, increases the financial institution's revenues, primarily in the form of an increase in transaction fees and interest payments received.

A model may be developed that correlates spending patterns of consumers based on lifestyle characteristics of those consumers. Lifestyle characteristics may include, for example and without limitation, credit bureau tenure, age, gender, disposable income, geographic location, household size, number of transaction cards in a household, size of total spending wallet, and other third party data, as will be discussed in further detail below. Once lifestyle characteristics are identified as indicators of certain spending patterns, consumers can be categorized based on their lifestyle characteristics and the correlated spending patterns.

A. Model Development

A model for determining consumer spending patterns using various lifestyle characteristics may be developed based on detailed analysis of a number of consumers. Such a detailed analysis may include determining the total size of wallet of the customer, as well as ascertaining one or more lifestyle characteristics of the customer. FIG. 1 is an illustration of an exemplary method 100 for modeling consumer spending patterns using various lifestyle characteristics.

In step 102, the total size of wallet is determined for a plurality of consumers. The total size of wallet is the entire amount of spend by a particular consumer from tradeline data sources over a given period of time. The total size of wallet of a consumer may be calculated based on, for example and without limitation, internal customer tradeline data and/or external tradeline data available from, for example, a credit bureau. An exemplary method of calculating the size of wallet of an individual is described in U.S. patent application Ser. No. 11/169,588, filed Jun. 30, 2005, entitled Method and Apparatus for Consumer Interaction Based on Spend Capacity, incorporated by reference herein in its entirety.

Once the size of wallet has been calculated for a plurality of consumers, method 100 proceeds to step 104. In step 104, a subset of consumers having a high share of wallet with a particular financial institution is identified. The share of wallet is the portion of the spending wallet that is captured by the particular financial institution. Consumers having a high share of wallet with the particular financial institution may be those consumers whose spend on accounts associated with the financial institution is more than, for example, 90% of their total spend. This subset of consumers is used by the financial institution in modeling consumer behavior, because the financial institution typically has access to most of the individual records of charge of the consumers and can determine industry-related spending habits of the consumers. Consumers having an extremely high share of wallet with the financial institution (e.g., the top 1% of high-share consumers) may be excluded from the modeling process, to eliminate consideration of small business spending in the modeling process.

After determining the high-share subset of consumers, method 100 proceeds to step 106. In step 106, an industry size of wallet is calculated for each consumer. Information about the consumer's spending in various industries can be obtained in a variety of ways. As mentioned previously, since most of the spending of high-share consumers is done with the financial institution, the financial institution typically has a record of the consumer's spend by industry. If such a record does not already exist, the financial institution can, for example, analyze the records of charge of each consumer in the subset of consumers to determine the industry-related spending habits of each consumer. An industry is the type of good or service purchased by the consumer. Types of industries may include industries at a macro level, for example and without limitation, the travel industry, the restaurant industry, and the entertainment industry. Types of industries may also include industries at a micro level, for example and without limitation, the airline industry, the lodging industry, and the car rental industry, each of which is a subset of a macro industry, such as the travel industry. The industry related spending habits of a consumer include, for example and without limitation, the amount of spend in a given industry and the rate of spend in the given industry. Although the present invention will mostly be described with respect to spend in the travel industry, one of skill in the relevant art(s) will recognize that the methods and systems disclosed herein may involve spend in any other industry without departing from the spirit and scope of the present invention.

Because the subset of consumers has a high share of wallet with the financial institution, it is reasonable to assume that the spending habits identified for each consumer using the records of the financial institution are reflective of the consumer's spending habits across his or her entire spending wallet. For example, if a person has a high share of wallet with the financial institution, that person's travel spending on accounts associated with the financial institution is likely approximately equal to his or her total travel spending. The amount of industry spend by each consumer in the high-share subset of consumers is deemed to be that consumer's industry size of wallet.

Once the industry size of wallet of each consumer in the subset of consumers has been determined, method 100 proceeds to step 108. In step 108, relationships between the characteristics and an industry size of wallet are identified. To identify these relationships, the spend habits of multiple consumers are examined to ascertain characteristics of the consumers that influence or are indicative of spend in a given industry. These characteristics include, for example and without limitation, financial and demographic characteristics, and are referred to herein as lifestyle characteristics. For example, if the financial institution wants to determine what factors influence travel spending, profiles of consumers who spend a high percentage of their wallet on travel can be compared to identify common lifestyle characteristics. In another example, profiles of consumers who spend a high percentage of their wallet on travel can be compared to profiles of consumers who spend a low percentage of their wallet on travel to identify differentiating lifestyle characteristics.

Figure 3:
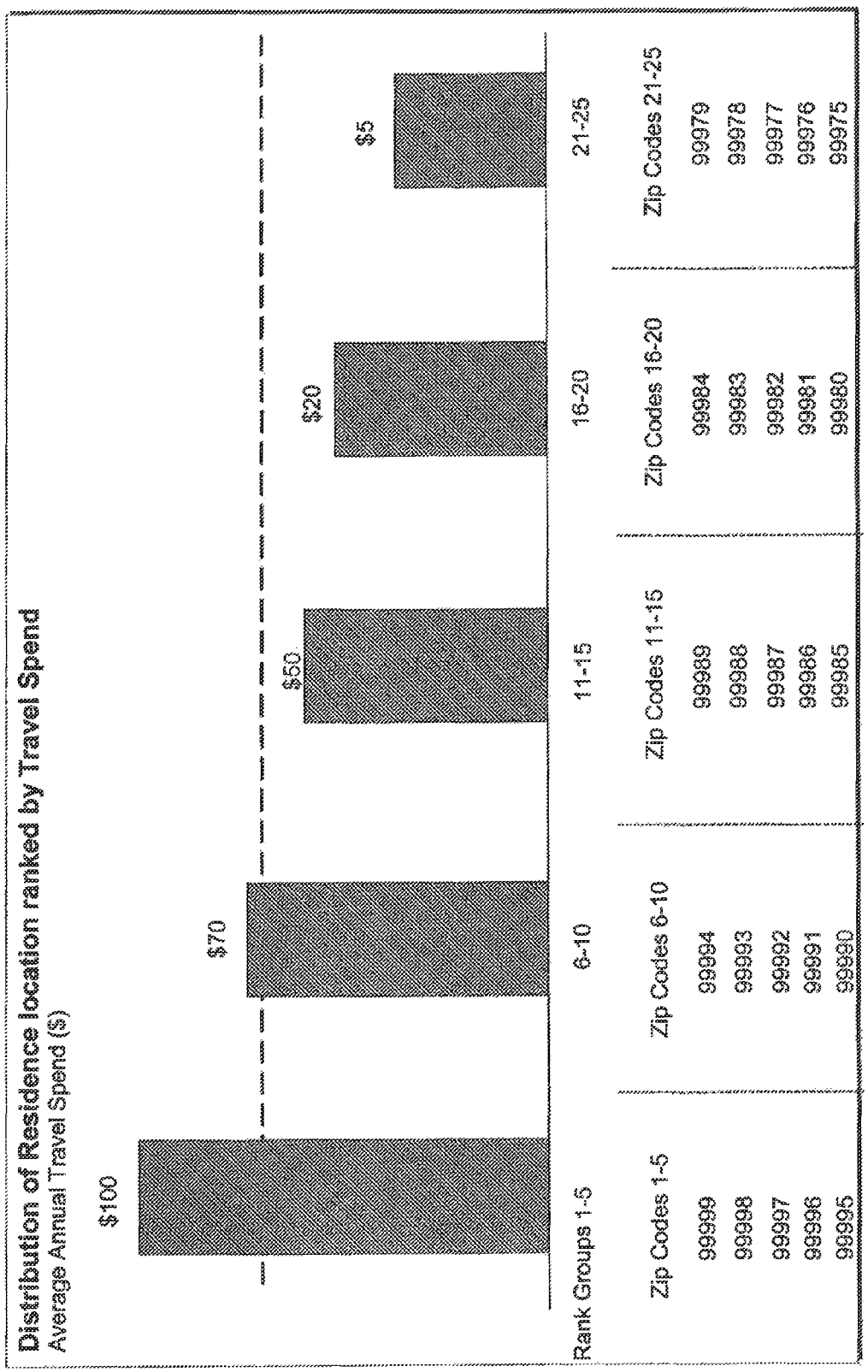
FIG. 3 is a graph of average travel size of wallet by residence location.

Some lifestyle characteristics may have a given weight (e.g., the magnitude of their effect on industry-related spend) regardless of the actual value of the characteristic. Other lifestyle characteristics may have a graded aspect to them, such that the weight of the variable is dependent on the value of the variable. An example lifestyle characteristic whose weight on airline spend varies based on the value of the characteristic is the geographic location of the consumer's residence. FIG. 3 is chart of residential zip codes versus average travel-related spend by residents of those zip codes. FIG. 3 takes into consideration the high-share subset of consumers, and computes, for example, an average airline spend value for each available zip code. As illustrated in FIG. 3, residents of zip codes closer to airports have more travel-related spend than residents of zip codes farther away from airports. A correlation thus exists between specific zip codes and the airline industry size of wallet, and the zip codes can be ranked based on their average airline spend. In this manner, the ranking becomes a variable indicative of airline spending.

Figure 4:
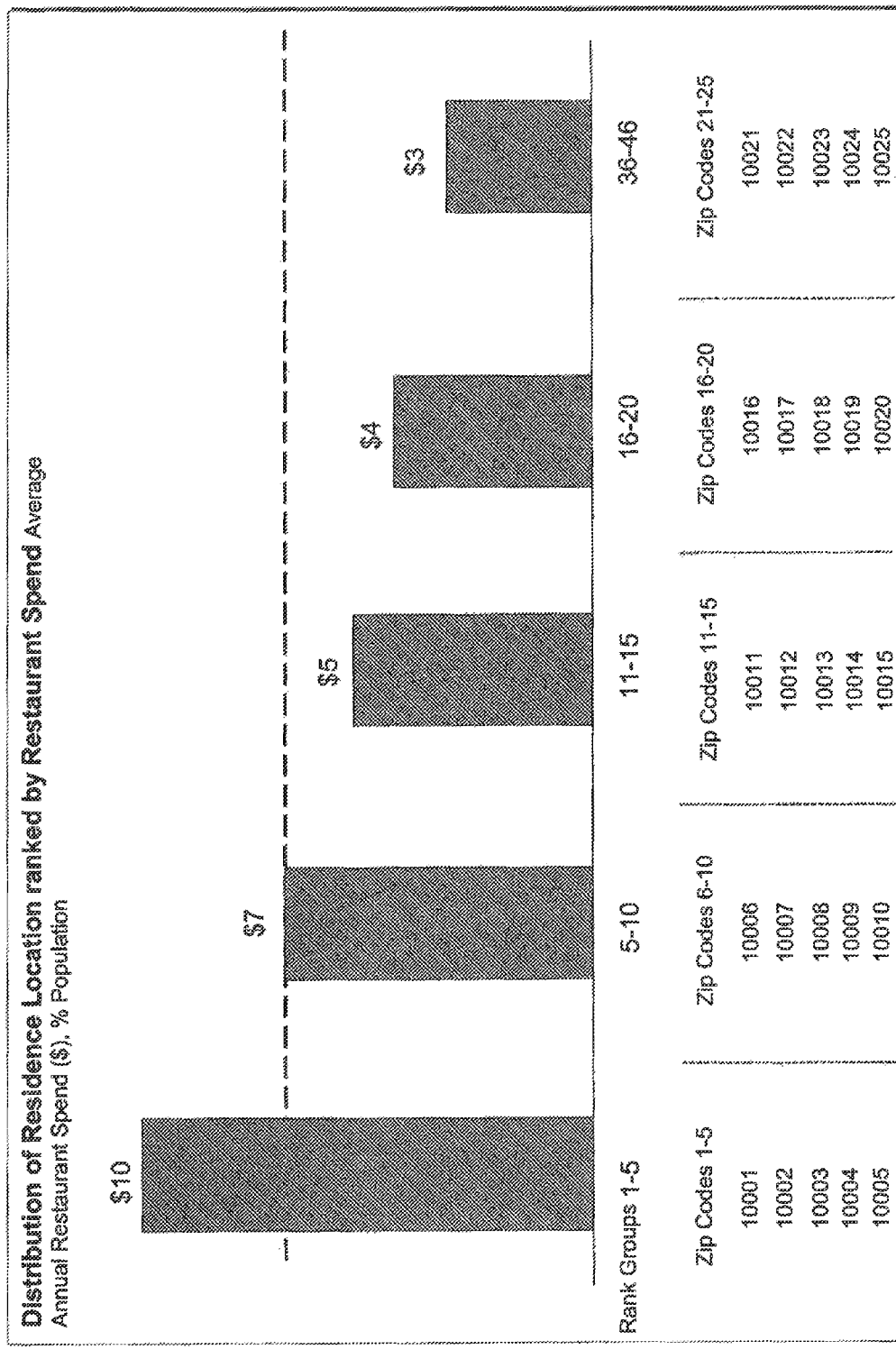
FIG. 4 is a graph of average restaurant size of wallet by residence location.

The geographic location of the consumer's residence can also influence restaurant spend, as illustrated in FIG. 4. FIG. 4 is a chart of residential zip codes versus average restaurant-related spend by residents of those zip codes. Correlations between specific zip codes and restaurant spending can thus be identified.

Figure 5:
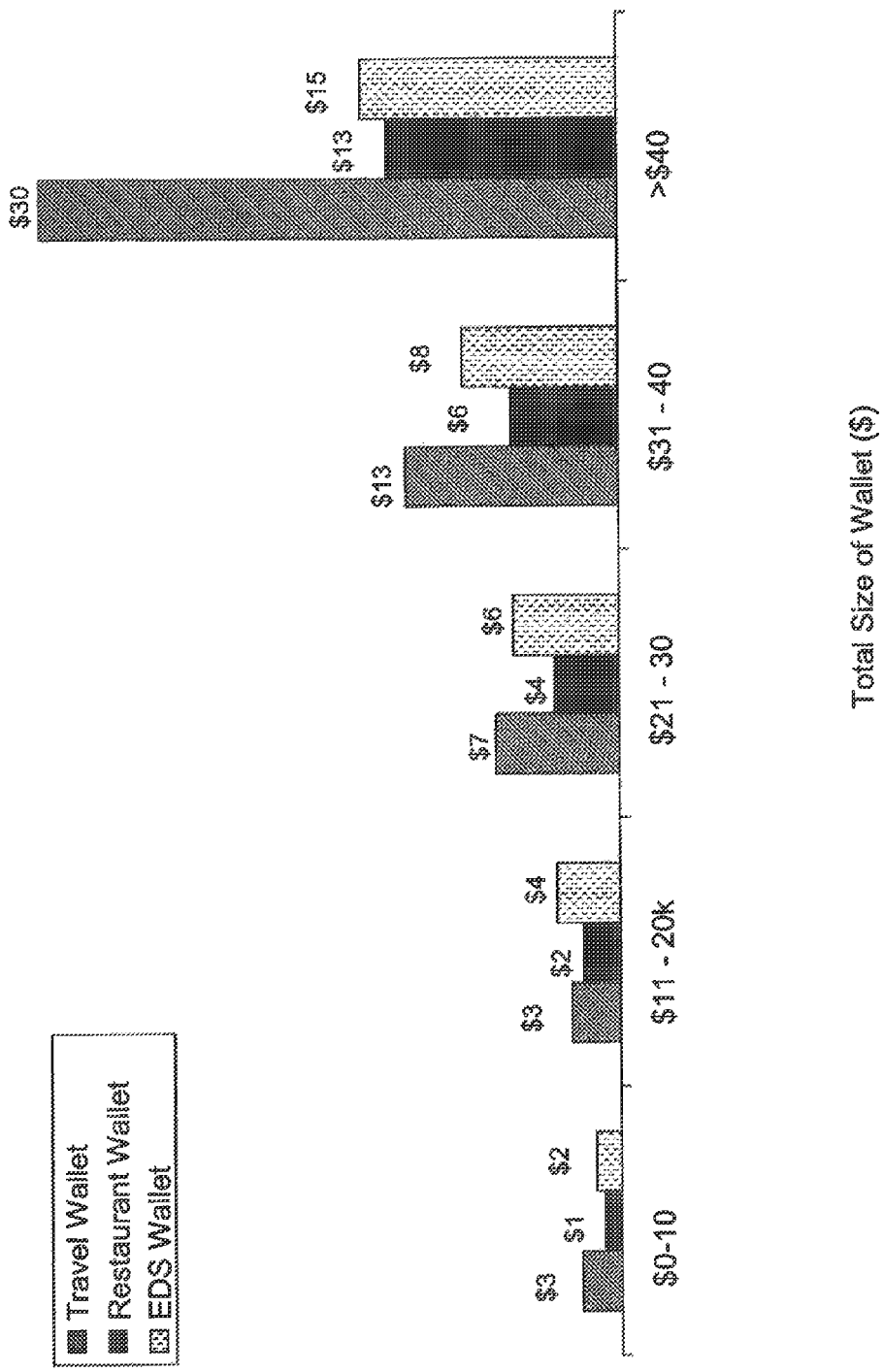
FIG. 5 is graph of average industry size of wallet relative to a consumer's total size of wallet.
Figure 6:
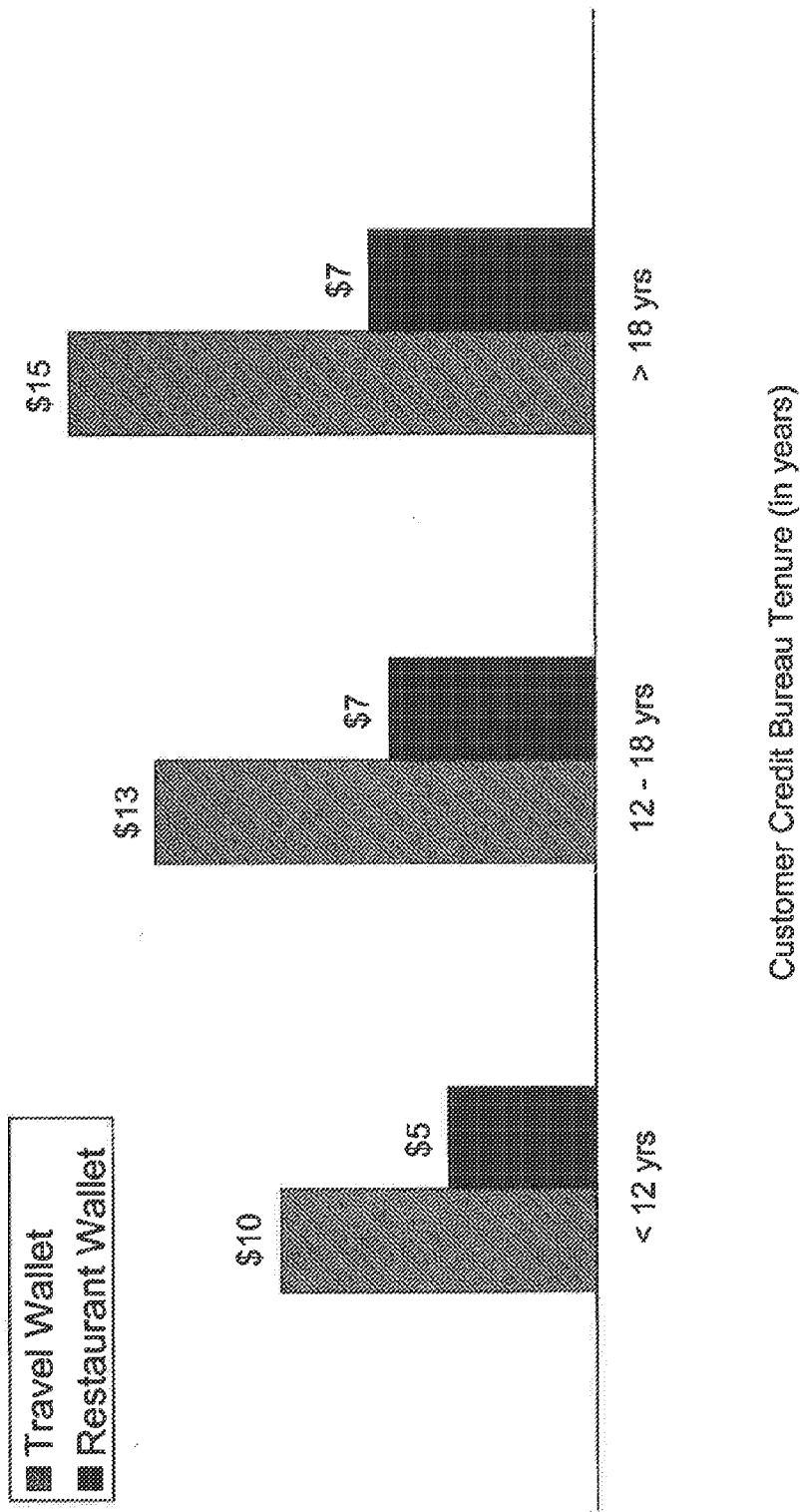
FIG. 6 is a graph of average industry size of wallet relative to a consumer's credit bureau tenure.
Figure 7:
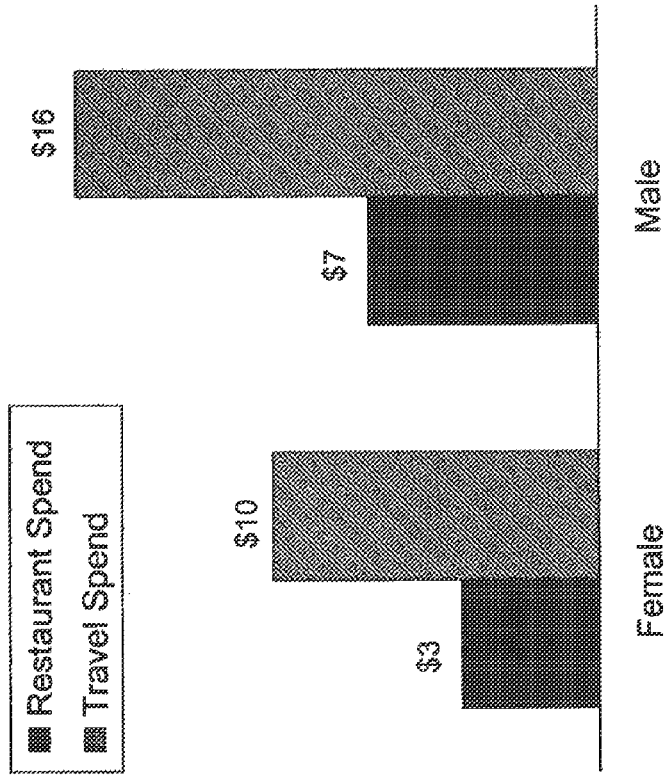
FIG. 7 is a graph of average industry size of wallet relative to a consumer's gender.
Figure 8:
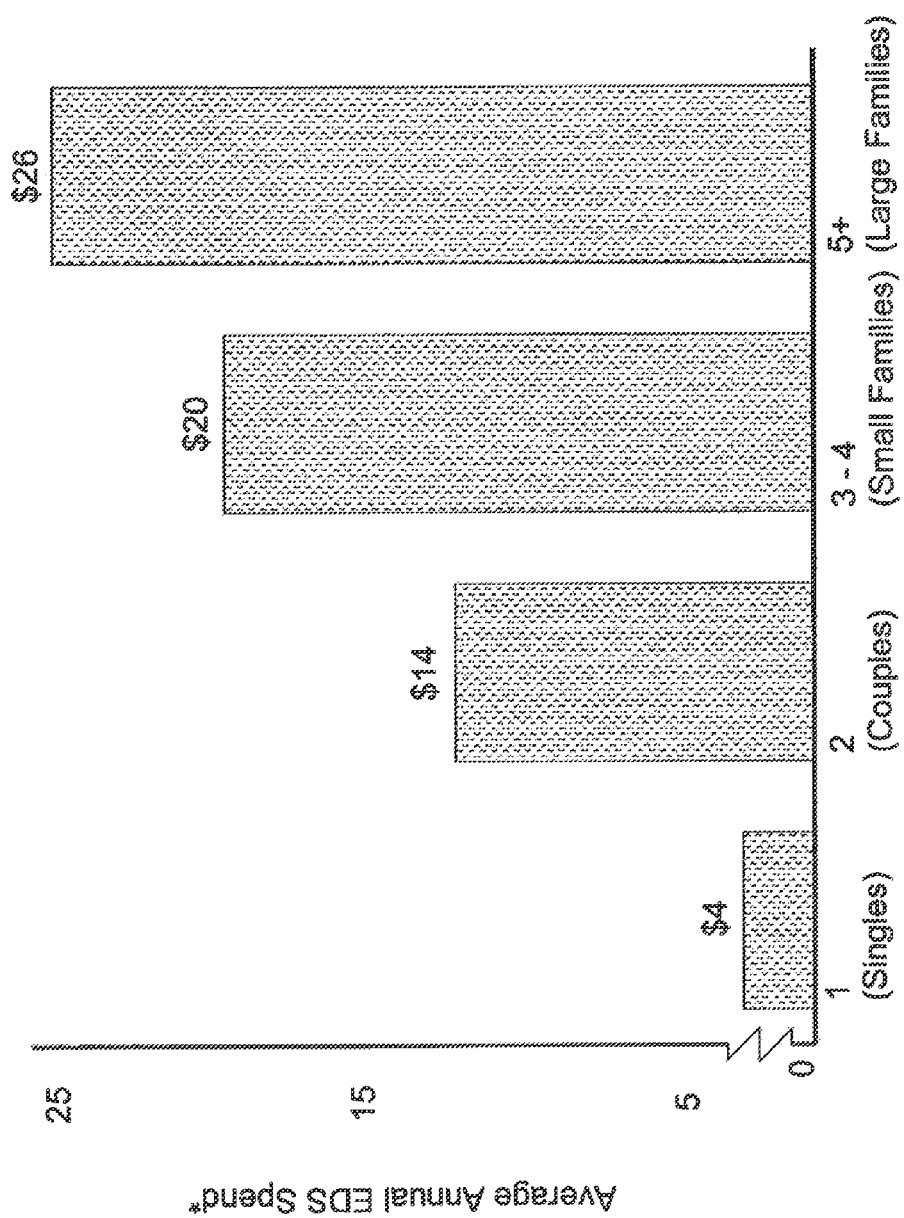
FIG. 8 is a graph of average everyday spend size of wallet by number of individuals in a household.
Figure 9:
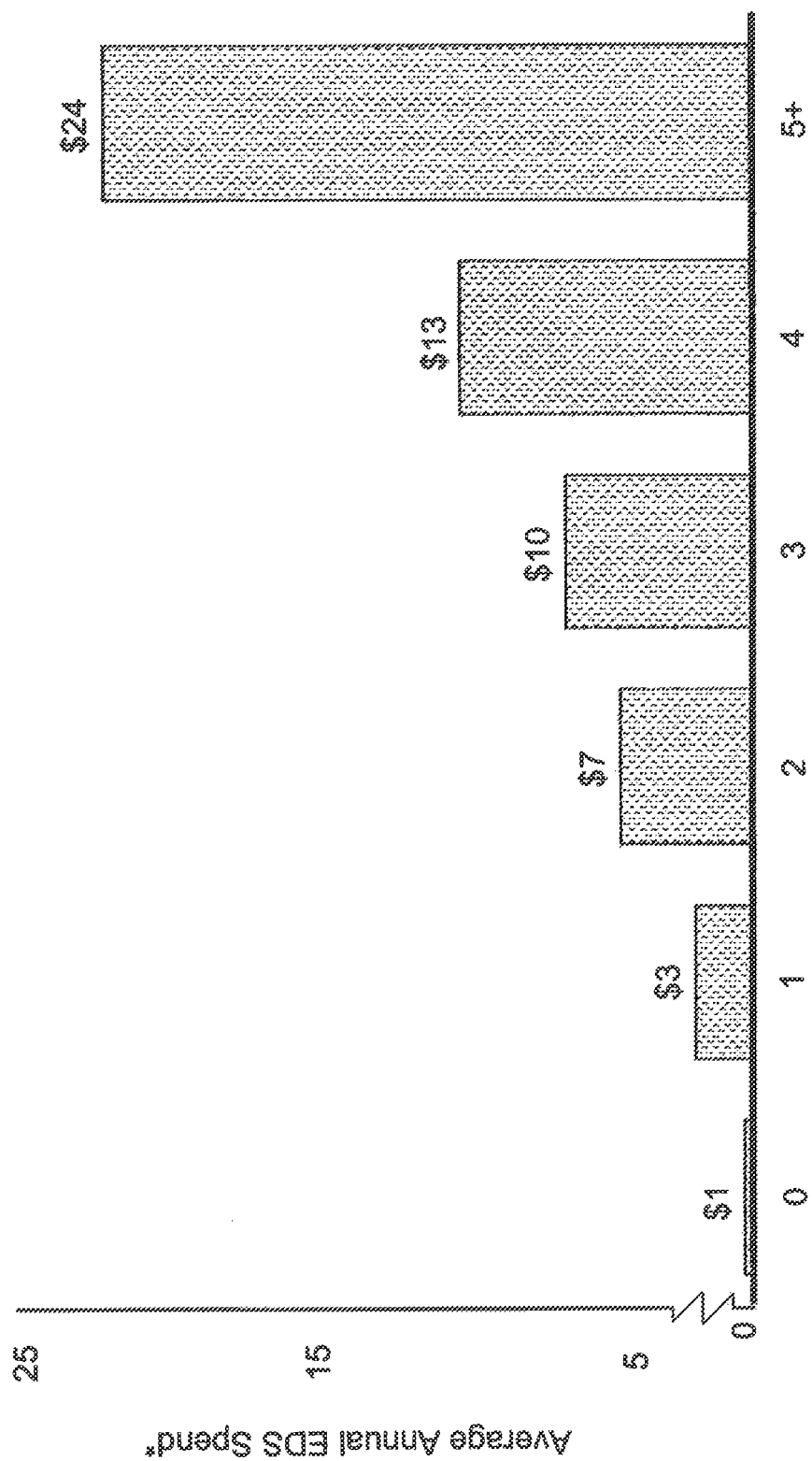
FIG. 9 is a graph of average everyday spend size of wallet by number of active transaction cards in a household.

Other lifestyle Characteristics that influence spend in various industries may include, for example and without limitation, credit bureau tenure, age, gender, disposable income, geographic location, household size, number of transaction cards in a household, size of total spending wallet, and other third party data. FIG. 5 is a chart illustrating how the total size of a consumer's wallet is indicative of travel-related spend, restaurant-related spend, and everyday spend. As illustrated, travel-related spend has the strongest correlation with the total size of the consumer's wallet. FIG. 6 is a chart illustrating how credit bureau tenure is indicative of travel-related spend and restaurant-related spend. As illustrated, travel- and restaurant-related spend are significantly lower for consumers having low tenure with the bureau, and relatively higher for high tenure consumers. FIG. 7 is a chart illustrating how gender is indicative of travel-related spend and restaurant-related spend. As illustrated, travel- and restaurant-related spend is higher for males as compared to females. FIG. 8 is a chart illustrating the relationship between household size and everyday spend. As illustrated, everyday spend varies significantly with household size. Similarly, FIG. 9 is a chart illustrating the relationship between the number of active transaction cards in a household and everyday spend. As illustrated, everyday spend varies significantly with the number of active household cards.

After the lifestyle characteristics have been identified, method 100 proceeds to step 110, in which a model to determine industry size of wallet based on lifestyle characteristics of a consumer is created. In a first embodiment, the model simply identifies a typical industry size of wallet for consumers having certain lifestyle characteristics, based on the sizes of spending wallets of analyzed consumers sharing those lifestyle characteristics. In a second embodiment, a size of wallet algorithm is identified based on the correlations between consumers having common lifestyle characteristics.

Figure 10:
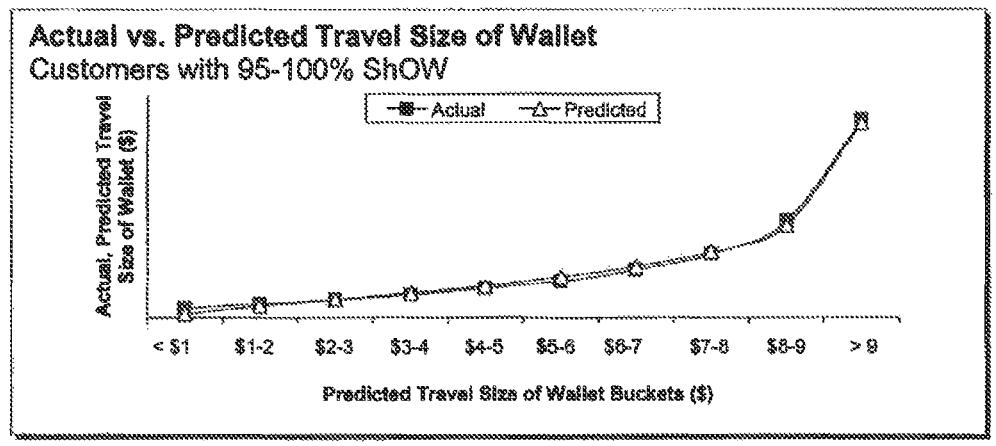
FIG. 10 is a graph illustrating the predictions of an exemplary size of travel wallet model against actual travel spend.
Figure 11:
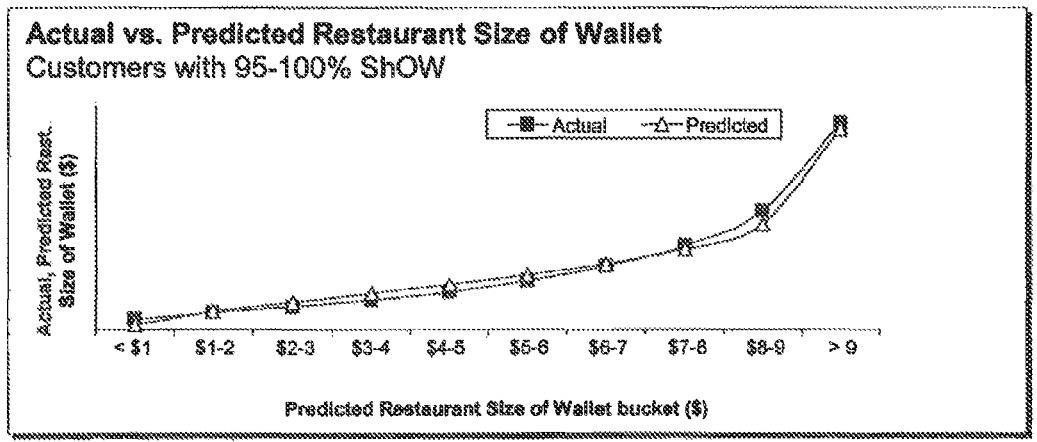
FIG. 11 is a graph illustrating the predictions of an exemplary size of restaurant wallet model against actual restaurant spend.

An example size of wallet algorithm for travel-related spend and restaurant related-spend is defined in Equation 1:

$$\text{Total Industry } SoW = A + (B^* \text{Total Size of Plastic Spend Wallet}) + (C^* \text{Location Rank}) + (D^* \text{Customer Tenure on Bureau}) + (E^* \text{Customer Gender}),$$

where A, B, C, D, and E are correlation factors or weights corresponding to the importance of the associated lifestyle characteristics. A, B, C, D, and E may vary depending on whether the algorithm is used to determine, for example, travel size of wallet or restaurant size of wallet. FIG. 10 is a graph illustrating the travel size of wallet values predicted for various spend levels compared to the actual travel size of wallet values for the various spend levels. FIG. 11 is a graph illustrating the restaurant size of wallet predicted for various spend levels compared to the actual restaurant size of wallet values for the various spend levels. As illustrated, this model has a high level of prediction accuracy.

Figure 12:
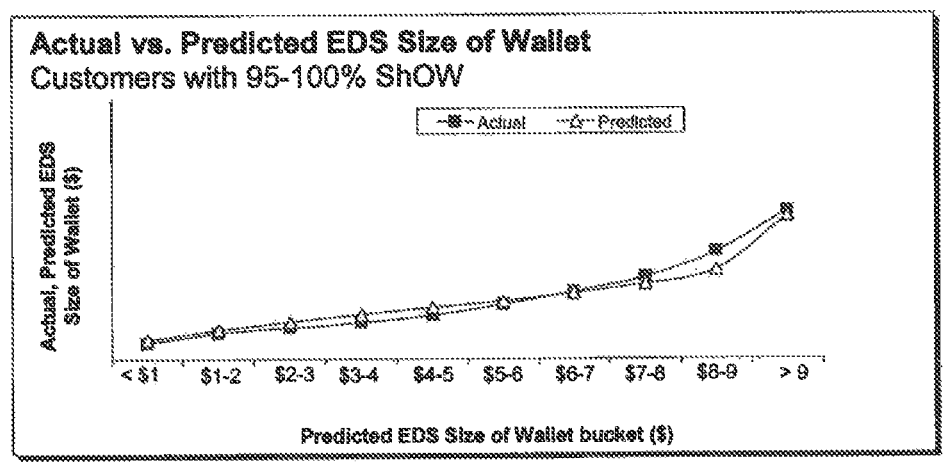
FIG. 12 is a graph illustrating the predictions of an exemplary size of everyday spend wallet model against actual everyday spend.

Similarly, an example everyday spend size of wallet algorithm is defined in Equation 2:

$$\text{Total } EDS\ SoW = V + (W^* \text{Total Size of Plastic Spend Wallet}) + (X^* \text{Number of Active Household Cards}) + (Y^* \text{Location Rank}) + (Z^* \text{Household Size}),$$

where V, W, X, Y, and Z are correlation factors or weights corresponding to the importance of the associated lifestyle characteristics. FIG. 12 is a graph illustrating the everyday spend size of wallet values predicted for various spend levels compared to the actual everyday spend size of wallet values for the various spend levels.

Similar modeling approaches can also be used to incorporate interaction between industry spends into the industry size of wallet model. For example, spend in particular industries or at particular merchants may be indicative of spend in other industries or at other merchants.

B. Consumer Targeting

Figure 2:
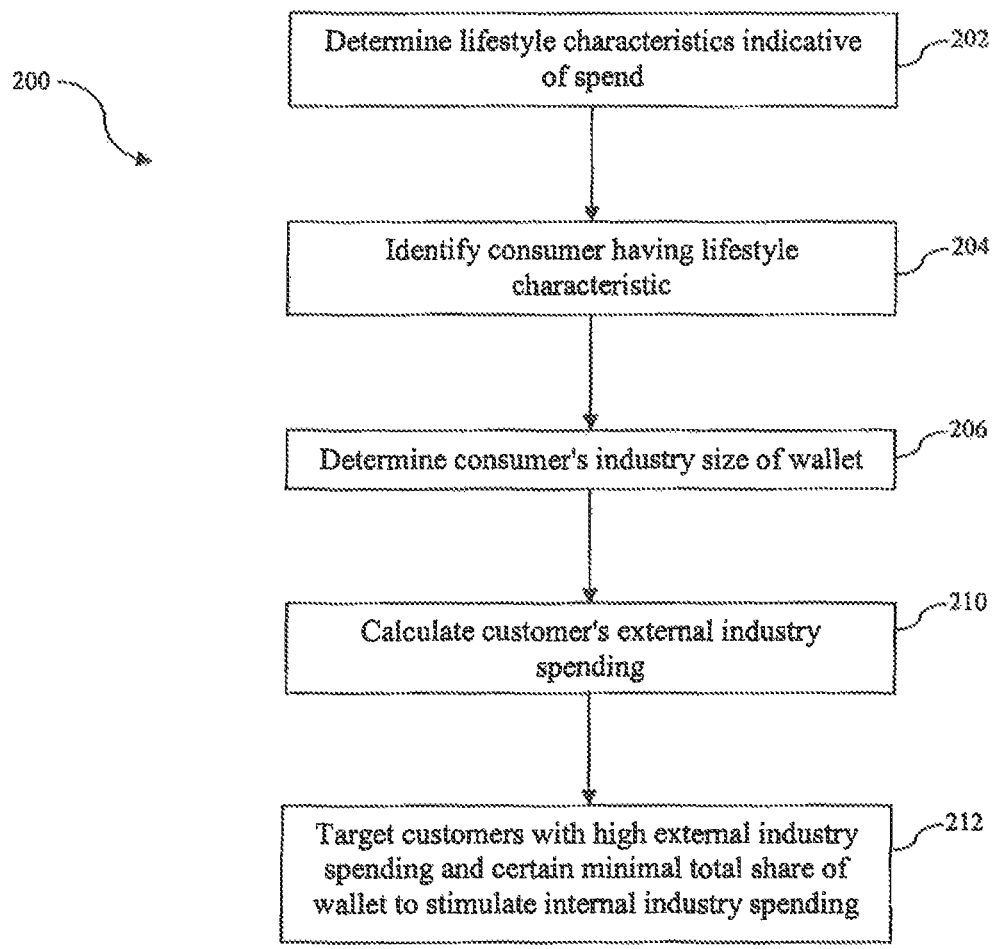
FIG. 2 is a flowchart of an exemplary process for targeting a consumer with an offer to increase spending.

Once a lifestyle characteristic indicative of spend in a particular industry has been identified, the financial institution can target consumers having that lifestyle characteristic with incentives to increase spend related to the industry, even if those consumers have low or medium share of wallet with the financial institution. FIG. 2 is an exemplary method 200 for targeting consumers with incentives to increase industry-related spend, according to an embodiment of the present invention.

In step 202, one or more lifestyle characteristics indicative of spend in a given industry are determined. These lifestyle characteristics may be determined in accordance with a method such as method 100 described above.

After step 202, method 100 proceeds to step 204. In step 204, a consumer having one or more of the determined lifestyle characteristics is identified. Since many lifestyle characteristics of a consumer are typically publicly available (such as, for example, from credit bureaus), the consumer does not need to have a high industry share of wallet with the financial institution in order to be identified by the financial institution. This method can thus be used to target an individual having a low or medium industry share of wallet with the financial institution. Since the identified consumer has a lifestyle characteristic in common with consumers who make purchases related to the given industry, the financial institution can assume, without specific knowledge of the identified consumer's industry-related spend, that the identified consumer also makes purchases related to the given industry and would be accepting of incentives to increase spend related to the given industry.

After identifying the consumer having one or more lifestyle characteristics indicative of spend in the given industry, method 200 proceeds to step 206. In step 206, the consumer is assigned an industry size of wallet based on the consumer's lifestyle characteristics. The industry size of wallet may be based on, for example, industry sizes of wallet calculated in step 110 (using, for example, Equation 1 or 2) of method 100 above.

The external size of wallet of the customer is calculated in step 210. The customer's external size of wallet may be calculated, for example, by subtracting the magnitude of the customer's industry spending associated with the financial institution from the magnitude of the customer's industry size of wallet. The remaining amount, which corresponds to spend in the industry that is not associated with the financial institution, is also referred to herein as the "external industry spend."

Method 200 then proceeds to step 212. In step 212, the identified consumer is targeted with an offer (or promotion) that will incent the consumer to increase spend related to the given industry. The offer may vary based on, for example, the external size of wallet calculated in step 210. If multiple consumers were identified in step 204, the consumers may be prioritized based on the external industry spend assigned in step 210, with consumers having a greater external industry spend taking priority over consumers having a smaller external industry spend.

Further, priority may be given to consumers having some minimal share of total wallet with the institution. A minimal share of total wallet will ensure a certain engagement level with the financial institution which would lead to improved responses to the spend offer. The customers can thus be optimized based on their total share of wallet and the amount of external industry spend, with the financial institution targeting only the most optimal consumers.

In a first embodiment, the offer may be an offer for a new product, which will encourage new spend related to the given industry. In the example of the airline industry, a consumer who has a lifestyle characteristic indicative of spend in the airline industry may be targeted, for example, with an offer for a credit card that is co-branded between the financial institution and an airline company. In a second embodiment, the offer may be an incentive to increase spending on an existing product held by the consumer. In the example of the airline industry, a consumer who has a lifestyle characteristic indicative of spend in the airline industry and who also has a financial account associated with a rewards program managed by the financial institution may be offered double reward points for spend on airline travel.

If a consumer qualifies for multiple spend offers or incentives, the financial institution may choose to target the consumer for the industry with the highest value of spend incentive. To do this, the consumer size and/or share of wallet is calculated for each industry (using, for example, Equations 1 and 2), and the industry having the largest size and/or share of the consumer's wallet determines the targeted industry.

III. Example Implementations

The present invention (i.e., process 100, process 200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 13:
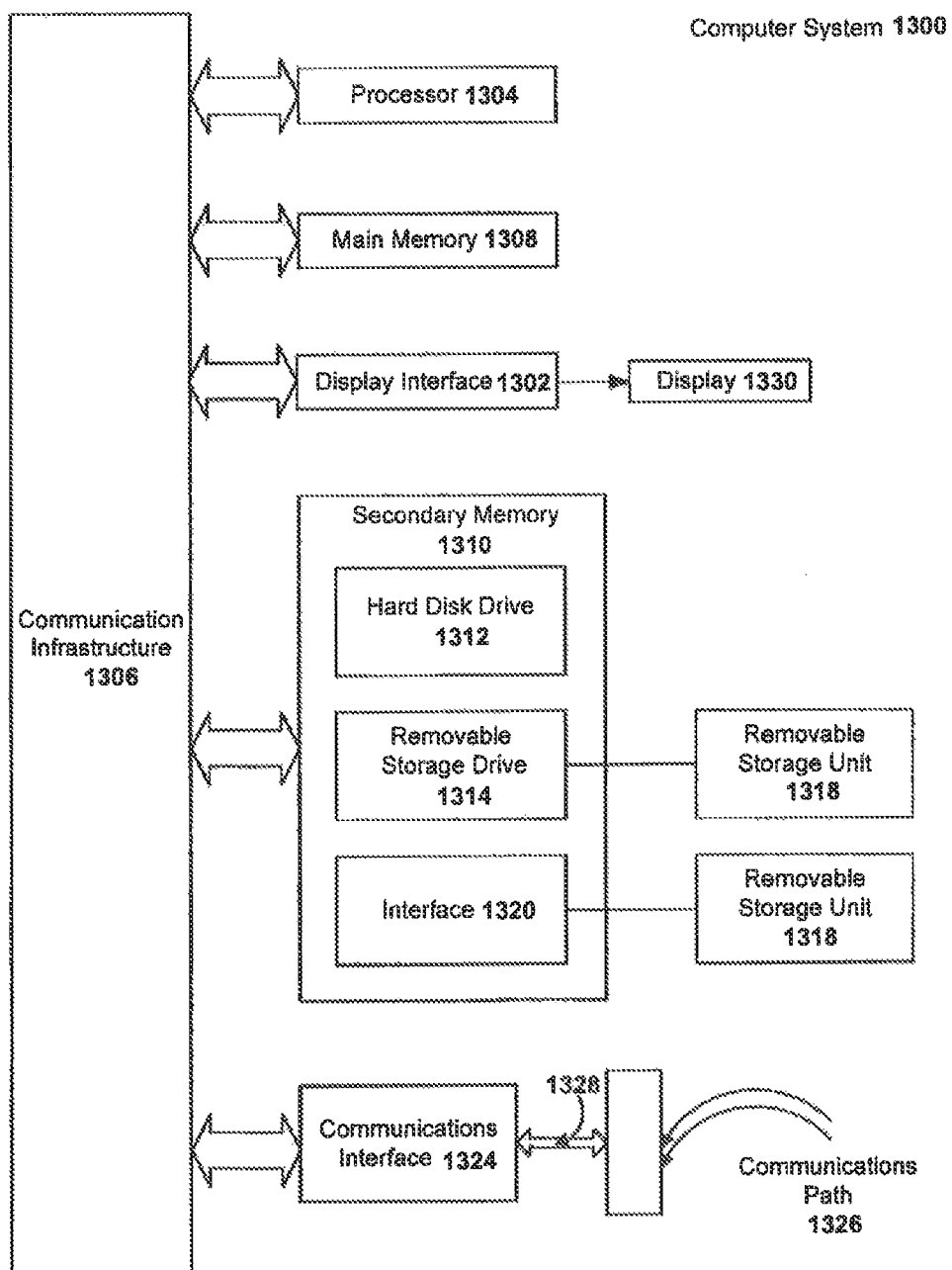
FIG. 13 is a block diagram of an exemplary computer system useful for implementing the present invention.

In fact, in one embodiment, the invention is directed toward one or more computer systems capable of carrying out the functionality described herein. An example of a computer system 1300 is shown in FIG. 13.

The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1318 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1318 and interfaces 1320, which allow software and data to be transferred from the removable storage unit 1318 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1314 and a hard disk installed in hard disk drive 1312. These computer program products provide software to computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

What is claimed is:

1. A method comprising:
    calculating, by a computer-based system for modeling consumer spend comprising a processor and a tangible, non-transitory memory, a size of wallet for each consumer in a plurality of consumers; and
    determining, by the computer-based system, an industry size of wallet for each consumer using a fixed weighting factor and a graded weighting factor in conjunction with lifestyle variables comprising at least one of a location rank, a length of each consumer's tenure with a credit bureau, each consumer's gender, and each consumer's household size, wherein the graded weighting factor varies in accordance with the value of at least one of the lifestyle variables.

2. The method of claim 1, wherein the calculating the size of wallet for each consumer in the plurality of consumers comprises modeling, by the computer-based system, spending patterns using internal customer data and consumer panel data.

3. The method of claim 1, wherein the calculating the size of wallet for each consumer in the plurality of consumers comprises estimating, by the computer-based system, credit-related information of each consumer based on tradeline data of each consumer, previous balance transfers of each consumer, and a model of consumer spending patterns to arrive at estimated credit-related information.

4. The method of claim 3, wherein the calculating the size of wallet for each consumer in the plurality of consumers further comprises offsetting, by the computer-based system, the previous balance transfers from the estimated credit-related information.

5. The method of claim 1, further comprising:
    calculating the share of wallet comprises calculating a share of wallet associated with a given financial institution; and
    determining a subset of the plurality of consumers comprises identifying consumers whose share of wallet associated with the financial institution is greater than approximately 90%.

6. The method of claim 1, wherein the determining an industry size of wallet comprises:
    determining the amount of spend within the industry using one or more accounts associated with a financial institution; and
    equating the amount of spend within the industry with the industry size of wallet.

7. The method of claim 1, further comprising:
    determining, by the computer-based system, a subset of the plurality of consumers whose share of wallet is above a given percentage of their size of wallet;
    deriving, by the computer-based system, a correlation between an industry size of wallet for a given consumer and one or more characteristics of the given consumer using the industry size of wallet for the consumers in the subset,
    wherein the characteristics of the consumer include at least one of:
    total size of wallet of the consumer;
    residence location;
    credit bureau tenure;
    age;
    gender;
    household size; and
    number of active transaction cards in a household of the consumer.

8. The method of claim 7, wherein the deriving a correlation comprises:
- identifying consumers having substantially similar industry sizes of wallet; and
- examining spend habits of the identified consumers to ascertain common characteristics that influence spend in the industry.

9. The method of claim 1, wherein the industry is at least one of a travel industry, a restaurant industry, or an everyday spend industry.

10. The method of claim 1, wherein the industry is at least one of an airline industry, a lodging industry, or a vehicle rental industry.

11. The method of claim 7, further comprising developing a model based on correlations between the industry size of wallet and the characteristics of the consumer.

12. A method comprising:
- calculating, by a computer-based system for targeting consumers comprising a processor and a tangible, non-transitory memory, a total share of wallet associated with a financial institution for one or more consumers;
- estimating, by the computer-based system, an industry size of wallet of each consumer; and
- calculating, by the computer-based system, an external size of the industry size of wallet of each consumer using a fixed weighting factor and a graded weighting factor in conjunction with lifestyle variables comprising at least one of a location rank, a length of each consumer's tenure with a credit bureau, each consumer's gender, and each consumer's household size, wherein the graded weighting factor varies in accordance with the value of at least one of the lifestyle variables.

13. The method of claim 12, wherein the industry size of wallet of each consumer is calculated by modeling, by the computer-based system, spending patterns using internal customer data, and consumer panel data.

14. The method of claim 12, wherein the industry size of wallet of each consumer is calculated by:
- estimating, by the computer-based system, credit-related information of each consumer based on tradeline data of each consumer, previous balance transfers of each consumer, and a model of consumer spending patterns to arrive at estimated credit-related information; and
- offsetting, by the computer-based system, the previous balance transfers from the estimated credit-related information.

15. The method of claim 12, further comprising targeting, by the computer-based system, one or more consumers having a relatively high external size of the industry size of wallet and a given minimal total share of wallet with offers to increase an industry share of wallet associated with the financial institution.

16. The method of claim 12, wherein the calculating an external size of the industry size of wallet of the consumer comprises subtracting industry spend of the consumer associated with the financial institution from the industry size of wallet of the consumer.

17. The method of claim 12, wherein the calculating an external size of the industry size of wallet of the consumer further comprises determining the amount of industry spend of the consumer associated with the financial institution from internal records of the financial institution.

18. The method of claim 15, wherein the targeting comprises targeting the consumer with an offer for a new product.

19. The method of claim 15, wherein the targeting one or more consumers comprises targeting the consumer with an incentive to increase spending on an existing product associated with the financial institution.

20. A computer readable storage medium bearing instructions, the instructions, when executed by a processor for modeling consumer spend by industry, cause said processor to perform operations comprising:
- calculating, by the processor, a size of wallet for each consumer in a plurality of consumers; and
- determining, by the processor, an industry size of wallet for each consumer using a fixed weighting factor and a graded weighting factor in conjunction with lifestyle variables comprising at least one of a location rank, a length of each consumer's tenure with a credit bureau, each consumer's gender, and each consumer's household size, wherein the graded weighting factor varies in accordance with the value of at least one of the lifestyle variables.

* * * * *